(12) United States Patent
Goldberg

(10) Patent No.: US 6,466,938 B1
(45) Date of Patent: Oct. 15, 2002

(54) METHOD AND APPARATUS FOR LOCATING A DEVICE USING A DATABASE CONTAINING HYBRID LOCATION DATA

(75) Inventor: Steven J. Goldberg, Fort Worth, TX (US)

(73) Assignee: Motorola, Inc., Schaumburg, IL (US)

( * ) Notice: Subject to any disclaimer, the term of this patent is extended or adjusted under 35 U.S.C. 154(b) by 52 days.

(21) Appl. No.: 09/629,033

(22) Filed: Jul. 31, 2000

(51) Int. Cl.[7] .............................................. G06F 17/30
(52) U.S. Cl. ..................... 707/100; 707/104.1; 701/213; 342/357.06; 342/357.08; 370/396; 455/403; 455/456
(58) Field of Search .......................... 707/10, 100, 104, 707/1; 701/208, 213, 214, 215; 342/357.1, 357.6, 357.07, 357.08, 402; 370/396; 711/201, 202; 455/456, 457, 403; 379/111

(56) References Cited

U.S. PATENT DOCUMENTS

| | | | |
|---|---|---|---|
| 5,490,258 A | * 2/1996 | Fenner | 711/1 |
| 5,727,057 A | * 3/1998 | Emery et al. | 379/211 |
| 5,826,195 A | * 10/1998 | Westerlage et al. | 455/456 |
| 5,860,136 A | * 1/1999 | Fenner | 711/201 |
| 5,937,343 A | * 8/1999 | Leung | 455/403 |
| 6,138,026 A | * 10/2000 | Irvin | 455/456 |
| 6,148,197 A | * 11/2000 | Bridges et al. | 455/432 |
| 6,181,944 B1 | * 1/2001 | Uebayashi et al. | 455/456 |
| 6,246,882 B1 | * 6/2001 | Lachance | 455/456 |
| 6,252,543 B1 | * 6/2001 | Camp | 342/357.06 |
| 6,259,924 B1 | * 7/2001 | Alexander, Jr. et al. | 455/456 |
| 6,266,523 B1 | * 7/2001 | Cook et al. | 455/403 |
| 6,275,707 B1 | * 8/2001 | Reed et al. | 455/456 |

OTHER PUBLICATIONS

Daffara, Flavio et al., "Improved Search Algorithm for Fast Acquisition in a DSP–based GPS Receiver", 19th International Symposium on Signals, Systems, and Electronics, Sep. 29–Oct. 2, 1998, pp. 310–314.*

* cited by examiner

Primary Examiner—Hosain T. Alam
Assistant Examiner—Shahid Alam
(74) Attorney, Agent, or Firm—Charles W. Bethards; Hisashi D. Watanabe

(57) ABSTRACT

A locating system includes a receiver for receiving a signal, having parameters, from a source. This locating system includes a database, which includes receiver records. Each receiver record includes (a) a source field, (b) a signal parameter field, (c) a receiver location computed using at least the source field and the signal parameter field. The receiver location computation has an accuracy. The database is indexed by the source field and the signal parameter field. The system includes a processor, which is configured to access the database using the source and signal parameters to find a coarse receiver record including a link to a fine receiver record. The fine receiver record has a better receiver location computation accuracy than the coarse receiver record.

22 Claims, 4 Drawing Sheets

| SOURCE IDENTIFIER RECORD |
|---|
| MEASUREMENT RECORD |
| MEASUREMENT RECORD |
| MEASUREMENT RECORD |
| MEASUREMENT RECORD |
| MEASUREMENT RECORD |
| SOURCE IDENTIFIER RECORD |
| MEASUREMENT RECORD |
| MEASUREMENT RECORD |
| MEASUREMENT RECORD |
| ... |

*FIG. 6*

| SOURCE IDENTIFIER FIELD |
|---|
| SOURC TYPE FIELD (e.g. CELLULAR BASE STATION, BLUETOOTH NODE, ETC.) |
| SOURCE LATITUDE FIELD |
| SOURCE LONGITUDE FIELD |
| SOURCE TRANSMITTER STRENGTH FIELD |
| ... |

*FIG. 7*

| RECEIVER IDENTIFIER FIELD |
|---|
| LINK TO SOURCE IDENTIFIER RECORD |
| RECEIVER TYPE FIELD (e.g. CELLULAR TELEPHONE, ETC.) |
| RECEIVED SIGNAL TYPE FIELD (e.g., CELLULAR, BLUETOOTH, ETC.) |
| RECEIVED SIGNAL STRENGTH FIELD |
| RECEIVER ORIENTATION FIELD (e.g., 0 DEGREES, 27 DEGREES, ETC.) |
| RECEIVED SIGNAL ANGLE-OF-ARRIVAL FIELD (e.g., 30 DEGREES, 48 DEGREES, ETC.) |
| DATE AND TIME OF MEASUREMENT FIELD |
| ENVIRONMENT CONDITIONS DURING MEASUREMENT FIELD (e.g. RANGING, TEMP=28°C, ETC.) |
| RECEIVER COMPUTED LATITUDE FIELD |
| RECEIVER COMPUTED LONGITUDE FIELD |
| CONFIDENCE FACTOR (e.g., CIRCULAR PROBABLE ERROR=10m, 100m, ETC.) |
| LINK TO MEASUREMENT RECORD TAKEN AT THE SAME TIME |
| LINK TO MEASUREMENT RECORD TAKEN AT THE SAME TIME |
| ... |

*FIG. 8*

METHOD AND APPARATUS FOR LOCATING A DEVICE USING A DATABASE CONTAINING HYBRID LOCATION DATA

FIELD OF THE INVENTION

The invention relates to locating a device using a database containing hybrid location data. More particularly, the invention relates to locating a device using a database which correlates location measurements having different accuracies.

BACKGROUND OF THE INVENTION

It is sometimes desirable to measure and report the location of an object. For example, if a person makes an emergency telephone call using, for example, a cellular telephone, it may be important to know the location of the person in order to render the requested aid. Further, it may be useful to track the locations of a company's employees while they are at work in order to route telephone calls or other services to them.

A device, such as a cellular telephone or a personal digital assistant (PDA), may be able to determine its location by measuring certain signal parameters, such as signal strength and the angle of arrival of the signal from a source, assuming the location of the source is known. The device may then compute, based on the signal parameters and the angle of arrival, its location and report it to a computer system which can, for example, store it in a database or make other use of the information.

Some devices may be capable of performing such location measurements using two sources. For example, a cellular telephone equipped with a local area wireless interface, such as Bluetooth, may be capable of measuring its location relative to a cellular base station, which has a known location, and its location relative to the local area transmitter, such as a Bluetooth transceiver with a known location. The relative accuracy of the measurements made with respect to the two sources may be such that one of the measurements is more accurate than the other.

BRIEF DESCRIPTION OF THE DRAWINGS

FIG. 6 illustrates the structure of a database according to the present invention.

FIG. 7 illustrates a source identifier record according to the present invention.

FIG. 8 illustrates a measurement record according to the present invention.

DETAILED DESCRIPTION OF THE PREFERRED EMBODIMENT

This disclosure builds and maintains a database which correlates coarse location measurements with fine location measurements. When both the coarse and fine location measurement capabilities are present in a single device, information from that device may be used to build the database. When only the coarse measurement capability is present in a device, the database can be accessed to refine the coarse measurement using the fine measurement.

Figure 1:
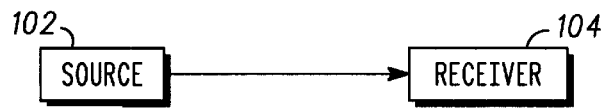
FIG. 1 is a block diagram of a communication system.

A source 102 communicates with a receiver 104, as shown in FIG. 1. For purposes of discussion, the communication between the source 102 and the receiver 104 is wireless. Any wireless method from which a relative location can be derived may be used for the purpose described in this application. Further, other location measurement techniques may be used including GPS, human entry, optical, measurement of the propagation time between the source and the receiver, measurement of the Doppler shift of the received signal, measurement of the time difference of arrival at a receiver of a signal transmitted from multiple sources at the same time, measurement of the time difference of arrival at a plurality of receivers of a signal transmitted by a source, or the cumulative time of propagation of a signal from a source to a receiver relayed by one or more intermediate devices.

It is assumed that either the source 102 or the receiver 104 is part of the infrastructure of the communication system and is fixed in position. For example, the infrastructure device might be a cellular base station or a Bluetooth transceiver. The techniques described herein are not limited to such an arrangement, however, and can apply even when both the source and receiver are mobile. Further, different location determination methodologies may be associated with the source and the receiver.

FIG. 1 illustrates the ideal case of a source 102 sending a signal to a receiver 104 without any obstructions. If the power level difference between what is sent and what is received and the angle of arrival is known, the relative location of each device to the other can be accurately determined. Consequently, if the source location is known, the receiver location can be derived.

Figure 2:
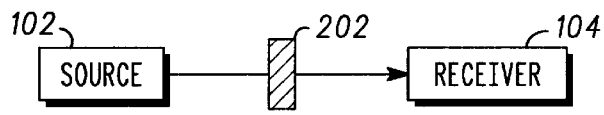
FIG. 2 is a block diagram of a communication system with an obstruction.

The introduction of some physical element, such as a wall 202, between the source 102 and the receiver 104 will decrease the power level seen by the receiver 104, as shown in FIG. 2. If the signals measured in FIG. 2 are used in a location predicting algorithm and the algorithm assumes no obstructions as shown in FIG. 1, the distance between the devices will be calculated to be larger than it actually is.

Figure 3:
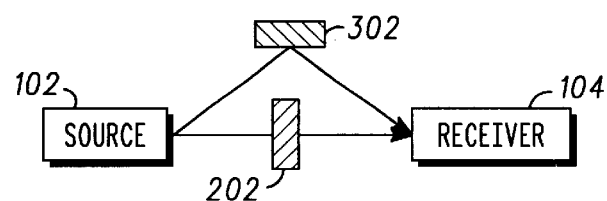
FIG. 3 is a block diagram of a communication system with an obstruction and a reflecting object.

Location errors can also be introduced by angle inaccuracies, as shown in FIG. 3. The receiver 104 may receive a signal from both a direct route, such as the route through wall 202, and an indirect route, such as the route reflecting from wall 302. If only the indirect route is detectable, the source will be assumed to be along the angle of reception of the reflected signal at a distance dependent on the length of the reflected signal's path and the reflection loss. If both the indirect and direct routes are received, there are conventional techniques that use the additional information in the reflected path to refine the direct path calculation of the relative location of the source. Without knowing the attenuation factors or the true paths of the received signals, however, there are a range of source points that could produce the same results.

One approach to improving the location finding capability in such circumstances is to attempt to communicate with two or more reference sources. Such an approach will improve the measurement accuracy in non-obstructed circumstances, but attenuation, refraction and reflection in one or more of the communication pairs will still introduce inaccuracies.

Hybrid location determination technologies are being developed. Devices that use these multiple technologies will be able to determine their locations to a higher accuracy than single technology devices. For example, a device capable of using a wide area system (e.g., a cellular phone) may use a technique similar to that mentioned previously (involving the relative signal strength and angle of arrival). The same device may have the capability of communicating and performing location determination using signals on a local area network (e.g., Bluetooth). The typical resolution of Bluetooth may approximate 10 meters in a built out system. The typical resolution of a cellular signal may be 100 meters under unobstructed conditions and considerably larger under obstructed conditions. One approach is to use the Bluetooth location information and to ignore or throw away the cellular location information.

The invention creates and maintains a database that stores both the coarse (e.g., cellular) and fine (e.g., Bluetooth) location information derived by the techniques just described, instead of simply throwing away the coarse information. The database links coarse and fine measurements made at the same or similar time or under similar circumstances.

Figure 4:
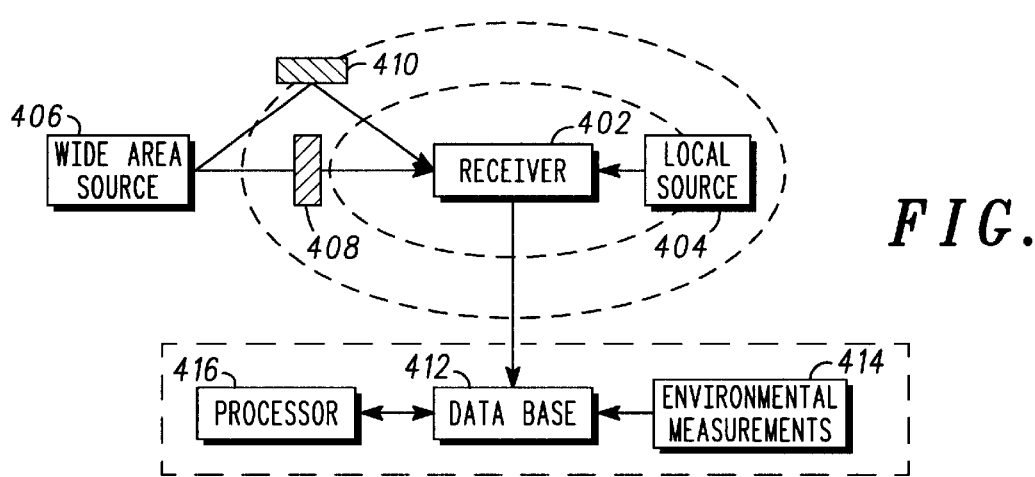
FIGS. 4 and 5 are block diagrams of a system according to the present invention.

A receiver 402 receives a signal from a local source 404, as shown in FIG. 4. The receiver 402 or another device, such as a base station, computes the location of the receiver 402 using the techniques described above or some other technique. At approximately the same time that it received the signal from the local source (i.e., within seconds or minutes), the receiver 402 receives a signal from a wide area source 406. The signal from the wide area source 406 may include a direct element which is either unobstructed or obstructed by an object, such as obstruction 408, and it may include an indirect element reflected off obstruction 410. Again, the receiver 402 will compute its location relative to the wide area source using the signal it receives from the wide area source. The computation of the relative location may be done within the receiver or by another device.

The two computed locations, along with the information used to compute those locations, are stored in a database 412. The two location measurements may be stored together or they may be stored separately, with a link between the two measurements indicating that they were taken at the same time and that at least one element, in this case the receiver 402, was common to both measurements. Preferably, environmental measurements 414, such as temperature, humidity, date, time of day, and the like, are also stored in the database 412 along with the location information. The environmental measurements 414 may be stored once and then linked to the coarse and fine location measurements or they may be stored with each of the location measurements.

A processor 416 coordinates the creation and maintenance of the database 412. Over time, the database will acquire and maintain location reports by a number of devices in a number of locations.

Figure 5:
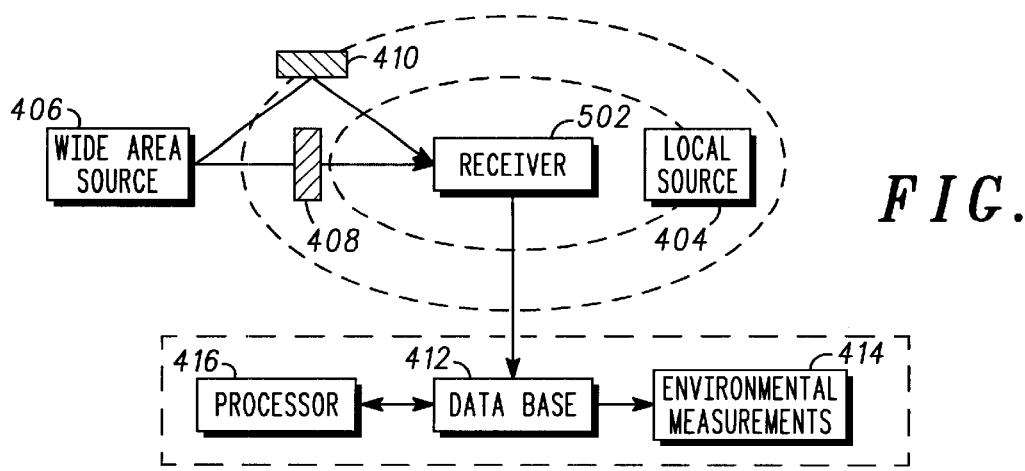

If another receiver 502, which is capable of receiving signals from the wide area source 406 but not from the local area source 404, moves into the same position previously held by receiver 402, as shown in FIG. 5, it will measure approximately the same location, assuming that the environmental measurements 414 are approximately the same. In this case, the receiver 502 is limited to the coarse location measurements possible using only the signal from the wide area source. The fine location measurement, using the signal from the local source 404, is not available and cannot be computed.

In the invention, the database 412 is accessed, by the receiver 402, the processor 416, or another device, using, for example, the signal parameters of the signal from the wide area source 406 measured by the receiver 502. The database 412 provides links to measurements made using the local source 404 when the signal parameters measured from the wide area source 406 were approximately the same. The processor 416 or the receiver 502 can use these fine location measurements to make a more accurate estimate of location than is possible using only the signals measured from the wide area source.

The database 412 may include source identification records and measurement records, as shown in FIG. 6. The measurement records may be grouped along with the source from which the measurement records were measured. Alternatively, the database may be a relational database, providing the capability of performing queries to find all measurement records made from a particular source, or other similar queries. The database may also take other forms.

An example of a source identifier record is illustrated in FIG. 7. This is merely an example and should not be seen as limiting the invention. The source identifier record may include a source identifier field, which will identify the particular source being measured. The source identifier record may also include a source type field, which will identify the source as, for example, a cellular base station, a Bluetooth node, or some other signal source. The source identifier record may also include a source latitude field and a source longitude field, identifying the location of the source. The source identifier record may also include a source transmitter strength field, which will include the signal strength of the signal transmitted by the source. The source identifier record may also include other fields useful in the analysis of location or for some other purpose.

A typical measurement record is illustrated in FIG. 8. Again, this is merely an example and should not be seen as limiting the invention. The measurement record may include a receiver identifier field, which will identify the particular receiver for which the record is stored. If the measurement record is not grouped with the source identifier record in the database, the measurement record may include a link to the source identifier record, which will link the measurement record to the source from which the measurement was made. The measurement record may also include a receiver type field, which will identify the receiver as a cellular telephone, a PDA, or some other device. It may also include a received signal type field, identifying the received signal as, for example, a cellular signal, a Bluetooth signal, etc. The measurement record may also include a received signal strength field, which will include the signal strength of the signal received from the source by the receiver.

The measurement record may also include a receiver orientation field, which records the orientation of the receiver relative to a known reference, such as true north. The measurement record may include a received signal angle-of-arrival field, which provides a relative angle of arrival of the signal from the source to the receiver. Using the receiver orientation field and the received signal angle-of-arrival field, the absolute angle of arrival, relative to a reference, can be determined.

The measurement record may also include a date and time of measurement field, which will include the date and time that the measurement was made. The measurement record may also include an environmental condition during measurement field, which will include such information as the temperature, humidity, whether it was raining, etc., during the measurement.

The measurement record may also include a receiver computed latitude field and a receiver computed longitude field, which include the receiver's latitude and longitude computed by the receiver or another device from the received signal characteristics and the angle of arrival information. The measurement record may also include a confidence factor field, which may include a metric associated with the accuracy of the receiver location computation, such as circular probable error (CPE).

Further, the measurement record may include links to measurement records taken at the same time. Thus, for example, a measurement record for a measurement taken with a coarse technique (such as using the cellular signal) may be linked to a measurement record derived using a finer technique (such as using the Bluetooth signal). Each measurement record may include links to many other measurement records taken at the same time or under the same conditions. For example, the links may be to measurement records taken on different days but at the same time and under similar environmental conditions.

Figure 9:
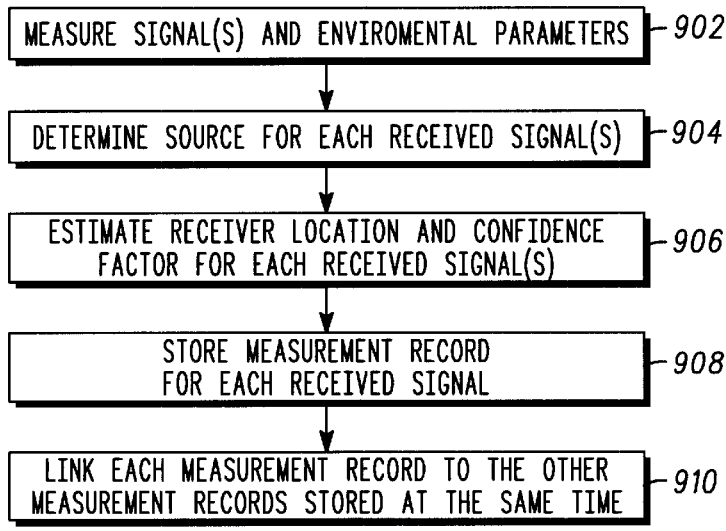
FIGS. 9 and 10 are flow charts.

The database is built and maintained as shown in FIG. 9. A device measures received signals and, optionally, environmental parameters (block 902). The device then determines the source for each of the received signals (block 904) and estimates the receiver location and confidence factor for each of the received signals (block 906). The device then stores a measurement record for each received signal (block 908). A link is then created between each messenger record and the other messenger records stored at the same time (block 910). The measurement records may be stored in the database by the device, by a processor, such as processor 416, or by any other device capable of administering the database 412.

Figure 10:
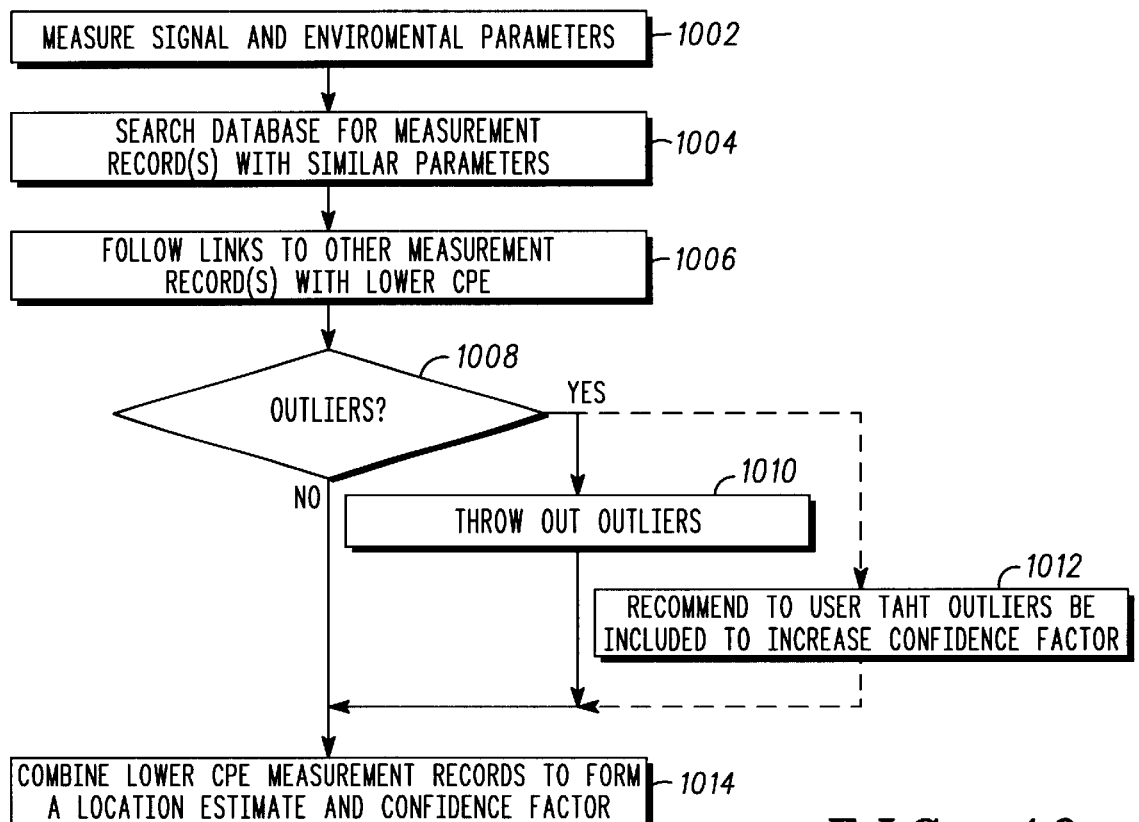

The database is used as shown in FIG. 10. A device measures the received signal, in this case from the source capable of providing a coarse location measurement, and environmental parameters, if they are available (block 1002). The device then searches the database for measurement records with similar signal parameters (block 1004). The device follows links in the found measurement records to other measurement records having lower circular probable errors (block 1006).

The device then determines whether any of the measurement records found by following links to measurement records with lower CPEs are outlyers. An outlyer may be, for example, a disc defined by a location and CPE that does not overlap the discs defined by the locations and CPEs of the other linked measurement records. Alternatively, it may be a location more than a predefined number of standard deviations from the mean of the locations of the other linked measurement records. Further, any technique found to be useful in identifying outlyers could be used.

The outlyers may be thrown out (block 1010). Alternatively, the outlyers may be used to increase the area reported as a possible location for the device with a consequent increase in the confidence factor (block 1012). This could be done automatically or it could be done after receiving permission from a user. The lower CPE measurement records are then combined to form a location estimate and confidence factor, which is reported to the user (block 1014).

Figure 11:
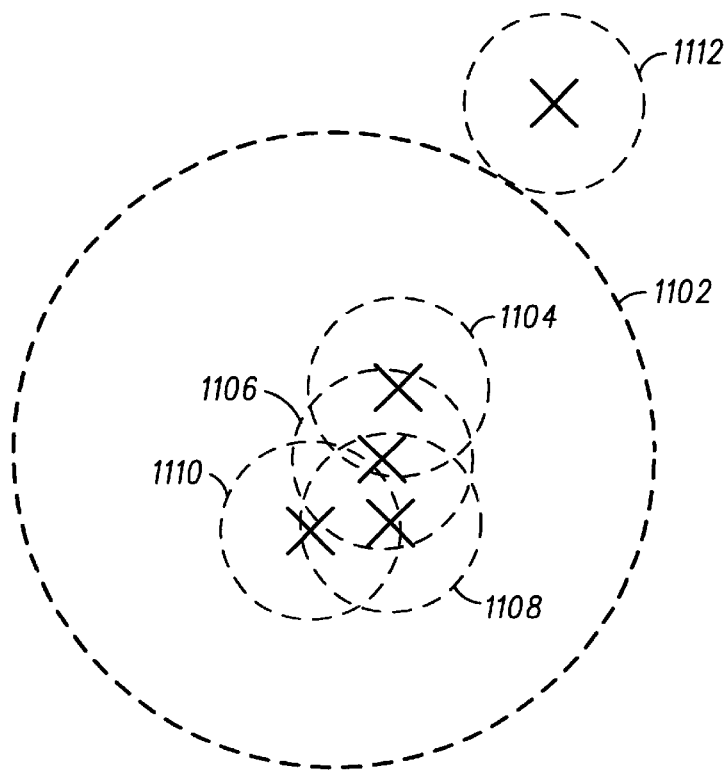
FIG. 11 shows the correlation between coarse measurements and fine measurements according to the present invention.

This process is illustrated graphically in FIG. 11. A device measures the signal parameters of a signal from a coarse source and uses those signal parameters to find the records in the database having similar signal parameters. The CPE 1102 of those measurement records is illustrated in FIG. 11. The device also follows links from those measurement records to measurement records with lower CPEs 1104, 1106, 1108, 1110, and 1112. Measurement record 1112 may be considered an outlyer for a number of reasons. First, it is outside the CPE defined by measurement record 1102. Second, it does not overlap any of the other lower CPE records 1104, 1106, 1108 and 1110. Third, it is more than a predetermined number of standard deviations from the mean of the locations of the other lower CPE records.

Figure 12:
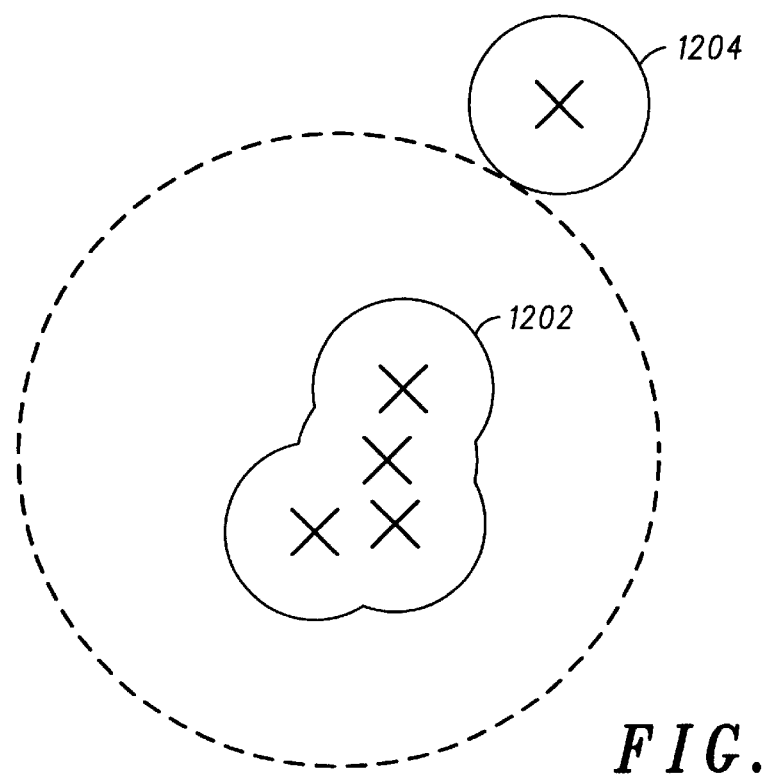
FIG. 12 illustrates possible locations reported under the conditions shown in FIG. 11.

Lower CPE measurement record 1112 may be simply discarded in the location reporting process. When reporting location, the device combines all of the undiscarded lower CPE measurement records and reports the combination as the potential location of the device, as shown in FIG. 12. For example, shape 1202 is the union of the discs formed by the locations and CPEs of measurement records 1104, 1106, 1108 and 1110, shown in FIG. 11. Shape 1204 is associated only with measurement record 1112. Therefore, if measurement record 1112 were discarded, only shape 1202 would be reported as the possible location of the device. In such a case, a confidence factor associated with shape 1202 would likely be reduced because of the presence of outlyer 1112, represented by shape 1204. If the user desires a report with a larger confidence factor, the device could report both shapes 1202 and 1204 in its location report along with a higher confidence factor.

Rather than reporting a shape such as shape 1202, the device may use a technique such as least squares to define a smaller shape and an associated confidence factor.

The environmental factors associated with each of the measurement records may be used to adjust the CPE associated with each of the measurement records as they are compared to each other. For example, if the CPE is found to vary with temperature, the CPE of one measurement record may be adjusted relative to the CPE of another measurement record during the computation if the two records were made when the temperature was different.

The foregoing describes preferred embodiments of the invention and is given by way of example only. The invention is not limited to any of the specific features described herein, but includes all variations thereof within the scope of the appended claims.

What is claimed is:

1. A locating system comprising a receiver for receiving a signal from a source, the signal having parameters;

a database comprising receiver records, each receiver record comprising (a) a source field, (b) a signal parameter field, (c) a receiver location computed using at least the source field and the signal parameter field, the receiver location computation having an accuracy;

the database being indexed by the source field and the signal parameter field;

a processor configured to access the database using the source and the signal parameters to find a first receiver record comprising a link to a second receiver record, the second receiver record having a better receiver location computation accuracy than the first receiver record.

2. The locating system of claim 1 wherein the first receiver record is associated with a first source; and the second receiver record is associated with a second source.

3. The locating system of claim 1 wherein
the signal parameters comprise one or more of: signal strength and angle of arrival; a propagation time between the source and the receiver; a Doppler shift of the received signal; a time difference of arrival at a receiver of signals transmitted at substantially the same time by the source and one or more other sources; a time difference of arrival at the receiver and one or more other receivers of a signal transmitted by the source; or a cumulative time of propagation of a signal from a source to a receiver relayed by one or more intermediate devices.

4. The locating system of claim 1 wherein
the receiver comprises the processor and the database.

5. The locating system of claim 1 further comprising
a central unit, remote from the receiver, the central unit being capable of communicating with the receiver;
the central unit comprising the database and the processor.

6. The locating system of claim 1 further comprising
a port for receiving environmental measurements.

7. The locating system of claim 1 wherein the receiver record further comprises
an environmental measurements field; and
the receiver location is computed using at least the source field, the signal parameter field, and the environmental measurements field.

8. A device for determining the location of a receiver from signal parameters provided by the receiver, the signal parameters corresponding to a signal received by the receiver from a source, the source having an identity, the device comprising
an interface for receiving the signal parameters;
a processor configured to determine the identity of the source from the received signal parameters;
a database comprising receiver records, each receiver record comprising (a) a source field, (b) a signal parameter field, (c) a receiver location, the receiver location computation having an accuracy, and (d) the receiver location accuracy;
the database being indexed by the source field and the signal parameter field;
the processor configured to access the database using the received signal parameters and the source determined from the received signal parameters to find a first receiver record, the first receiver record comprising a link to a second receiver record, the second receiver record having a better receiver location computation accuracy than the first receiver record.

9. The device of claim 8 wherein
the processor is configured to access the database using the received signal parameters and the source determined from the received signal parameters to find a plurality of first source receiver records, each first source receiver record comprising a link to second source receiver records, each second source receiver record having a better receiver location computation accuracy than the first source receiver records.

10. The device of claim 9 wherein
the processor is configured to determine a confidence factor using the receiver location and receiver location computation accuracy associated with each of the second source receiver records.

11. The device of claim 10 wherein
the processor is configured to compute a receiver location based on the union of the plurality of areas defined by the receiver locations and receiver location computation accuracies associated with a subset of the second source receiver records.

12. The device of claim 11 wherein
the subset is chosen so that the confidence factor is greater than a predetermined amount.

13. The device of claim 11 wherein
the subset is all of the second source receiver records.

14. A method for determining the location of a receiver, the method comprising
receiving signal parameters from the receiver, the signal parameters corresponding to a signal received by the receiver from a source;
accessing a database to find a coarse source receiver record associated with the source and having substantially the same signal parameters, the coarse source receiver record having a link to a fine source receiver record, the fine source receiver record having a better receiver location computation accuracy than the coarse source receiver record;
reporting as a receiver location a receiver location and a receiver location computation accuracy associated with the second source receiver record.

15. The method of claim 14 wherein accessing comprises
accessing a database to find a plurality of coarse source receiver records associated with the source and having substantially the same signal parameters, two or more of the coarse source receiver records having links to fine source receiver records, the fine source receiver records having better receiver location computation accuracies than their respective coarse source receiver records.

16. The method of claim 15 further comprising
reporting as the receiver location the union of the areas defined by a receiver location and a receiver location computation accuracy associated with a subset of the fine source receiver records.

17. The method of claim 14 further comprising
receiving environmental measurements.

18. The method of claim 17 wherein accessing comprises
accessing the database to find a coarse source receiver record associated with the source and having substantially the same signal parameters and environmental measurements.

19. A memory for storing data for access by an application program being executed on a processor, comprising
a data structure stored in said memory, the data structure including information resident in a database used by the application program and including a coarse measurement record data object comprising:
a signal parameter data object associated with a signal received by a receiver from a source;
a source identifier data object associated with an identity of the source;
a receiver location data object computed from at least the signal parameter data object and the source identifier data object; and
a link object pointing to a fine measurement record data object containing data objects associated with a different source and recorded at the same time as the first measurement record data object.

20. The memory of claim 19 wherein the coarse measurement record data object further comprises:
an environmental measurements data object; and
wherein the receiver location data object is computed from at least the signal parameter data object, the source identifier data object, and the environmental measurements data object.

21. The memory of claim 19 wherein the signal parameter data object comprises one of:

a received signal strength object, an angle to the source data object, and a receiver orientation data object;

a data object representing propagation time between the source and the receiver;

a data object representing Doppler shift of the received signal;

a data object representing a time difference of arrival at a receiver of signals transmitted at substantially the same time by the source and one or more other sources;

a data object representing a time difference of arrival at the receiver and one or more other receivers of a signal transmitted by the source; and a data object representing a cumulative time of propagation of a signal from a source to a receiver relayed by one or more intermediate devices.

22. The memory of claim 19 further comprising a confidence factor data object computed from at least the signal parameter data object and the source identifier data object.

* * * * *